HALL EFFECT MEMORY DEVICE

Filed July 24, 1957

INVENTORS H. L. BARNEY
F. P. BURNS
BY H. O. Wright
ATTORNEY

United States Patent Office 2,964,738

Patented Dec. 13, 1960

2,964,738

HALL EFFECT MEMORY DEVICE

Harold L. Barney, Madison, and Fred P. Burns, Summit, N.J., assignors to Bell Telephone Laboratories, Incorporated, New York, N.Y., a corporation of New York Filed July 24, 1957, Ser. No. 673,813

3 Claims. (Cl. 340—174)

This invention relates to electrical circuits and more particularly to electrical circuits employing magnetic cores.

With the advance of the data processing art it has become highly desirable to store pulse information and, thereafter, at the instance of an interrogation or recall signal to apply that stored information to a utilization circuit without disturbing the significance of the stored information for later recall.

Devices of the prior art have been employed successfully to achieve this useful purpose but are open to various objections. Some among them have been slow in response to an interrogating signal, others have been equivocal in their storage of binary information; that is to say, the response of these has been limited to two conditions, a YES or a NO, but a NO which is ambiguous in that the NO information is represented by an absence of stored information. Still others of the prior art storage devices have suffered in greater or lesser degree from partial destruction of the stored information in the process of readout, that is, in interrogating the signal stored.

It is accordingly a general object of this invention to store electrical pulse signal information within a magnetic core by establishing either of two alternative magnetic conditions and to recover that information rapidly and unequivocally but without any destruction of the stored information.

These objects are achieved in accordance with the invention by the employment of a magnetic core constructed of material having a rectangular hysteresis loop and having a magnetic gap into which a Hall Effect plate is inserted.

In accordance with a further feature of the invention, an input signal coil is wound about the magnetic core to store input pulse signals by coercing the magnetic polarization of the core to one of two alternative states. A source is provided for driving a current through the aforementioned Hall Effect plate in a direction perpendicular to the magnetic flux of the core and a utilization circuit is connected to two electrodes disposed on the plate along a line perpendicular to both the magnetic core flux and the direction of the aforementioned current flow.

The invention will be more clearly understood and other objects, features and advantages thereof will become apparent from a consideration of the appended claims and the following detailed description of illustrative embodiments of the invention shown in the accompanying drawings, in which:

Figure 1:
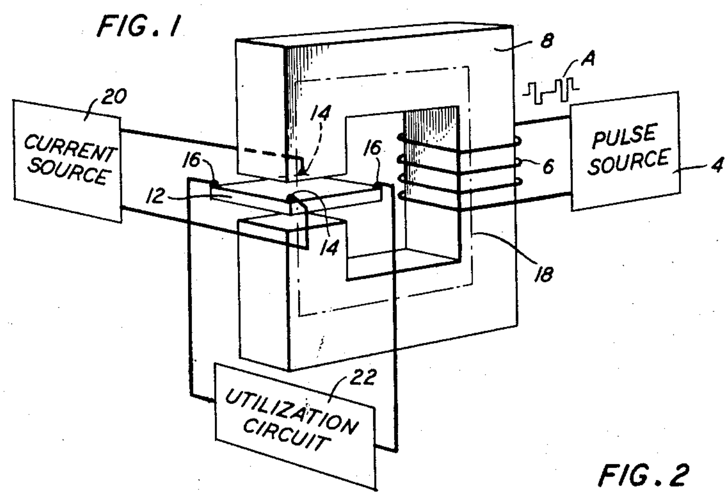
Fig. 1 is a partial schematic diagram of an illustrative embodiment of the invention adapted for effecting a magnetic storage of pulse information and a subsequent nondestructive readout of the stored information.

Referring now more particularly to the drawings, Fig. 1 shows a pulse source 4 connected for applying a train of pulses, such as that illustrated by the waveform A, to an input coil 6, wound about a substantially closed magnetic core 8 constructed of ferrite material having a central axis 18. The ends of the core are separated slightly to form a magnetic gap which is shown for purposes of clarity in disproportionate dimensions. Within this gap there is disposed a Hall effect plate 12 which may be constructed of any one of several well-known materials having a high charge carrier mobility, that is, materials which exhibit the Hall effect, for example, indium antimonide.

Two pairs of electrodes 14 and 16 are respectively connected to the Hall effect plate at points which define two mutually orthogonal conduction paths and the plate itself is disposed within the core gap in an orientation substantially perpendicular to the central axis 18 and, hence, to magnetic flux which flows within the magnetic core. A sensing current source 20 which may be simply a battery or alternatively, a more complex signal source, is connected serially with the input electrodes 14 and a utilization circuit 22 is serially connected with the output electrodes 16.

The core 8 is constructed of a material having a rectangualr hysteresis loop and a sufficient coercive force to overcome the demagnetixing effect of the gap between the core ends, thus to preserve the rectangular response of the core. This coercive force may be about 30 oersteds for an assumed core length of two inches along the central axis 18, a gap width of 15 mils and a saturation flux within the core of the order of 8000 Gauss. This necessary force is, in accordance with classical magnetic theory, directly proportional to the gap length and the total magnetic core flux and inversely proportional to the core length. A convenient core material, for example, comprises magnetic iron oxide to which significant amounts of cobalt ferrite have been added to increase the coercive force as is well known in the art.

Upon application of the successive On and Off pulses of the train A, the magnetic polarization of the core 8 is alternately reversed such that the magnetic flux flowing substantially perpendicular to the plate 12, along the central axis 18, alternately changes direction.

Current from the source 20 flows between the input electrodes 14 and, under the influence of this magnetic core flux, produces a Hall voltage between the output electrodes 16. This voltage is applied to a utilization circuit 22.

By virtue of the rectangular hysteresis loop of the core 8, pulses applied to the coil 6 drive the magnetic flux of the core from one to the other of two substantially stable conditions of magnetic polarization. The magnetic remanence of the rectangualr hysteresis loop core material maintains this polarization at a high level over an indefinite period of time. Hence, the information represented by the last of the pulses of the train A remains stored within the core for a similar indefinite period of time without regard to the duration of interpulse interrogations by currents from the source 20 or to the number of such interrogations. The rectangular hysteresis loop makes for a rapid shift of the core polarization in response to applied input pulses. This rapid shift of polarization makes structures in accordance with the invention particularly adaptable to employment in the high speed data processing devices which are of such increasing importance in the communication art.

Figure 2:
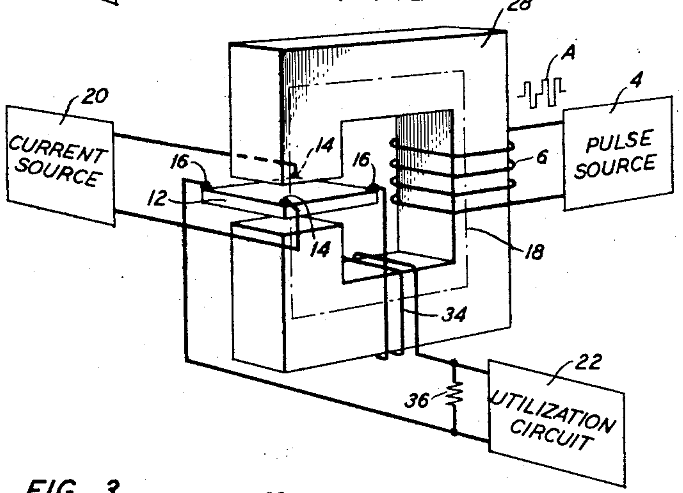
Fig. 2 is a partial schematic diagram of an illustrative embodiment of the invention which is more refined than the embodiment illustrated in Fig. 1.

Turning next to Fig. 2, here, as in the illustrative embodiment of Fig. 1, is shown a pulse source 4 which supplies input signals to a coil 6 wound about a rectangular hysteresis loop ferromagnetic core 28 to control the polarization of the core. A source 20 supplies current to flow through a Hall effect plate 12 between two diagonally opposite electrodes 14, input electrodes. A second pair of electrodes 16, output electrodes, are quadrantally placed on the plate with respect to the pair of input electrodes 14 and are connected in circuit with a utilization circuit 22. Connected in tandem with these electrodes and the utilization circuit, there is provided, in accordance with the invention, an auxiliary coil 34 wound in aiding relation with the coil 6 and having a suitable number of turns to provide a magnetizing force sufficient to compensate for the demagnetizing force of the gap between the two ends of the core 28. Thus, the need for adjusting the coercive force of the core material by selection of an appropriate percentage of ingredients is eliminated.

A resistor 36 is inserted in parallel with the utilization circuit and is of convenient value to regulate the current flow through the coil 34 and the utilization circuit 22 for the accomplishment of the separate functions of these two elements of the invention.

Figure 3:
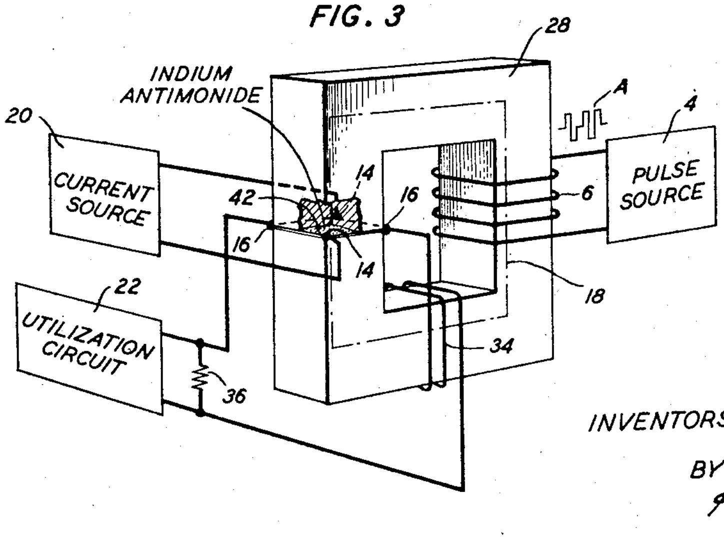
Fig. 3 is a partial schematic, partially sectioned isometric diagram of a third illustrative embodiment of the invention.

Next, in Fig. 3 there is shown an arrangement of a rectangular hysteresis loop magnetic core with a Hall effect plate and the ancillary structures similar to the structural arrangement shown in Fig. 2. The structure shown in Fig. 3, however, differs in one important respect from that of Fig. 2. The Hall effect plate 42 consists in a film of indium antimonide of negligible thickness deposited on the core within the magnetic gap between the two ends of the core. Thus, the magnetic gap in the core and its consequent demagnetizing force are both of similar negligible proportions. Hence, the energy dissipated within the auxiliary coil may be reduced to a vanishingly small amount. No concern need be had for providing insulation between the film of Hall effect material and the magnetic core inasmuch as the electrical resistivity of the well-known rectangular hysteresis loop materials is generally several orders of magnitude greater than the resistivity of Hall Effect materials.

It is apparent to one skilled in the art that the scope of this invention is not bounded by the two illustrative embodiments of the invention shown. For example, it is clear that the current source 20, shown in both Figs. 1 and 2 may, as mentioned heretofore, be a source of recurrent pulse signals of alternative direction. Hence, a structure in accordance with the invention may be employed to provide a signal indication of the sign of the product of a current pulse with the last signal applied to the magnetizing winding 6.

These and numerous other modifications of the illustrative embodiments described will be apparent to one skilled in the art and are clearly within the scope of the invention.

What is claimed is:

1. A signal storage device which comprises a core of rectangular hysteresis loop ferromagnetic material having a central axis and a magnetic gap transverse thereto, a planar Hall effect member having a first conduction path and a second conduction path substantially orthogonal to said first path, said member being disposed in said gap in substantially orthogonal relation with said central axis, whereby magnetic flux flowing in said core intercepts each of said conduction paths in substantially orthogonal relation, a sensing current source connected in circuit with said first conduction path, a utilization circuit connected in circuit with said second conduction path, and an input pulse signal circuit comprising an input magnetizing coil wound about said core and a source of a train of pulse signals connected thereto, an auxiliary coil wound on said core in aiding relation with said magnetizing coil and serially connected with said utilization circuit and said second path, whereby signals applied to said utilization circuit compensate for the demagnetizing effect of said magnetic gap.

2. Apparatus as set forth in claim 1 wherein the windings of said auxiliary coil are proportioned directly to the width of said gap and to the magnetic flux density established in said core by pulses from said source and inversely to the length of said central axis.

3. Apparatus as set forth in claim 1 and in combination therewith resistor means connected in circuit with said auxiliary coil and said utilization circuit for proportioning current flow through said coil and said utilization circuit, the current through said auxiliary coil providing sufficient flux in said core to compensate for the demagnetizing effect of said magnetic gap.

References Cited in the file of this patent

UNITED STATES PATENTS

| | | |
|---|---|---|
| 2,649,574 | Mason | Aug. 18, 1953 |
| 2,734,187 | Rajchman | Feb. 7, 1956 |
| 2,736,822 | Dunlap | Feb. 28, 1956 |
| 2,783,456 | Steagall | Feb. 26, 1957 |
| 2,822,533 | Duinker et al. | Feb. 4, 1958 |
| 2,862,184 | Longini | Nov. 25, 1958 |

FOREIGN PATENTS

| | | |
|---|---|---|
| 1,139,314 | France | June 27, 1957 |